United States Patent [19]

Moore

[11] 4,286,030

[45] Aug. 25, 1981

[54] THERMOSET RESIN IMPREGNATED WEB AND PROCESS OF MAKING

[75] Inventor: Charles B. Moore, North Quincy, Mass.

[73] Assignee: W. R. Grace & Co., Cambridge, Mass.

[21] Appl. No.: 118,701

[22] Filed: Feb. 6, 1980

[51] Int. Cl.³ .............................................. H01M 2/16
[52] U.S. Cl. .................................. 429/253; 429/254; 156/335; 162/157 R; 428/302
[58] Field of Search ........................ 429/252, 254, 253; 162/146, 157 R, 165; 428/252, 302; 156/335

[56] References Cited

U.S. PATENT DOCUMENTS

| | | | |
|---|---|---|---|
| 2,687,447 | 8/1954 | Merrill | 429/253 |
| 3,328,207 | 6/1967 | Beaulieu | 429/253 |
| 3,843,484 | 10/1974 | Kamiyoshi et al. | 156/335 |
| 3,893,871 | 7/1975 | Jones | 429/253 |
| 4,204,054 | 5/1980 | Lesas | 162/146 |

*Primary Examiner*—Donald L. Walton
*Attorney, Agent, or Firm*—Edward J. Hanson, Jr.; C. E. Parker

[57] ABSTRACT

Battery separators, filters and other porous semi-rigid products are provided by a thermoset resin impregnated fibrous web containing cellulosic fiber, synthetic wood pulp, paper making staple long fiber and thermoset resin. The temperature for thermosetting can exceed the Vicat softening and even the melting temperature of the synthetic pulp without the loss of the flexibilizing effect of the synthetic pulp. By extension the teaching reaches to non-fibrous and non-porous materials. A process is also revealed.

27 Claims, 2 Drawing Figures

U.S. Patent  Aug. 25, 1981  4,286,030
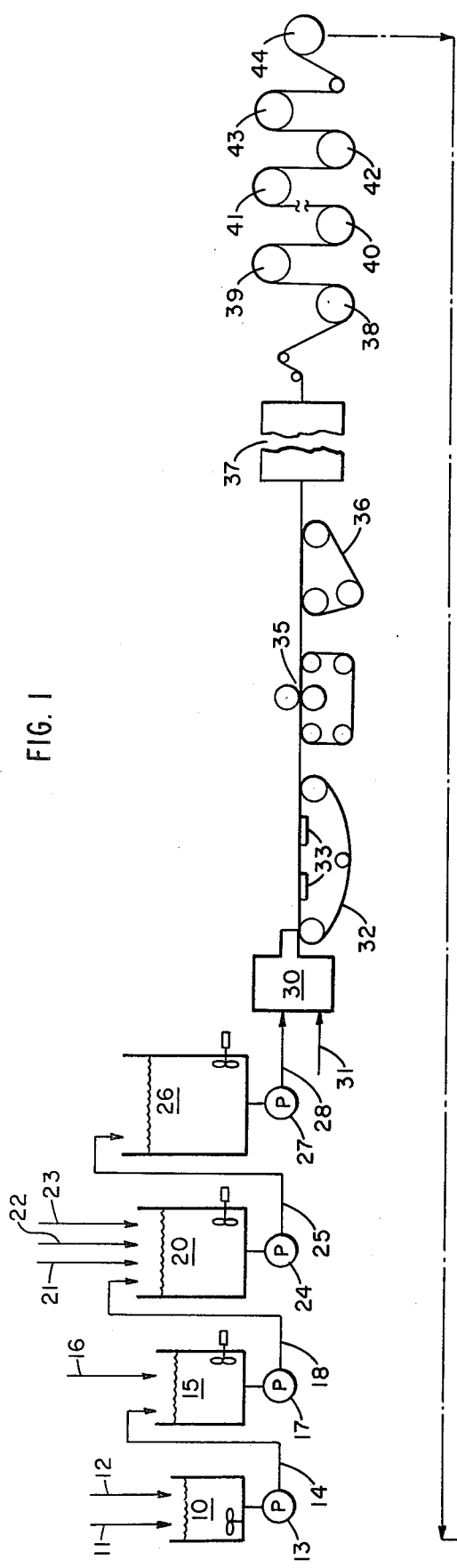
FIG. 1
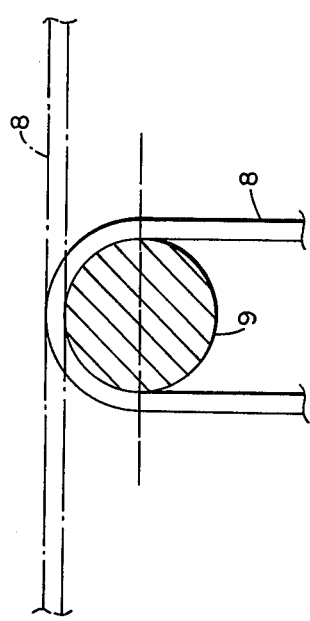
FIG. 2
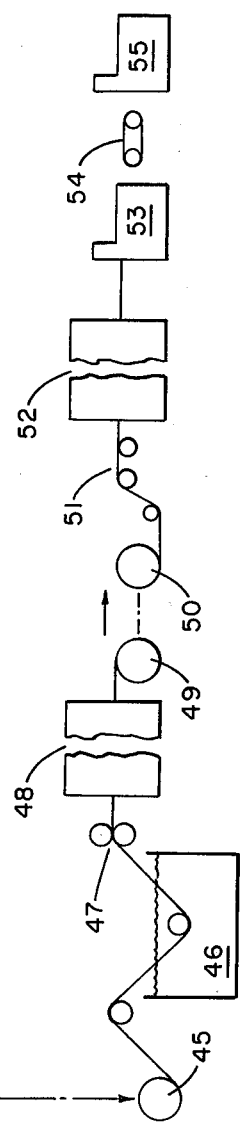

THERMOSET RESIN IMPREGNATED WEB AND PROCESS OF MAKING

BACKGROUND OF THE INVENTION

This invention relates to thermoset resin impregnated fibrous web battery separators, filters and other semi-rigid products, and to the curing of thermoset resin on thermoplastic members, particularly those having melting, Vicat softening or shrinking by more than 5% points below the curing temperature of the thermoset resin.

A porous battery separator sheet made from 50% glass fiber and 50% cellulosic pulp impregnated with 12½ to 30% thermosetting resin is revealed in U.S. Pat. No. 2,687,445. A lead acid battery separator containing fibrous polyolefin synthetic pulp, particulate siliceous filler, long paper making staple fiber and optionally up to 10% cellulosic fiber but not impregnated with a thermosetting resin is shown in co-pending application, U.S. Ser. No. 935,280, filed Aug. 21, 1978, now U.S. Pat. No. 4,216,281, and assigned to the same assignee as the present application. As far as is known, a polymeric synthetic pulp has never been used in a web impregnated with a thermoset resin. The addition of such a synthetic pulp to such a web has been found to provide a product having unique properties. Surprisingly it has been found that thermoplastic synthetic pulps can be used even when the thermo-setting temperature to be used in curing the resin will exceed the Vicat softening point and even the melting point of the synthetic pulp. Thus, for example, the cellulosic fibers in such a web can be protected from the deleterious corrosion of a battery environment.

It is one object of the present invention to provide a new porous web that has chemical resistance and substantial rigidity combined with significant flexibility without brittleness.

It is a further object of the present invention to provide a new and improved battery separator.

It is another object of the present invention to provide an improved porous sheet containing synthetic fibers that has improved stiffness with fracture resistance, improved chemical resistance, superior delamination resistance, superior inter-fiber bonding, improved thermal resistance and resistance deterioration on aging.

A further object of the invention is to provide a process for manufacturing a web containing cellulosic fiber and at least 5% by fiber weight polyolefin synthetic pulp and impregnated with 10 to 50% by weight of a thermoset resin based on the weight of the fiber.

A still further object of the invention is to provide a process that will maintain the flexibility of a thermoplastic synthetic pulp while setting a thermosettable resin thereon at a temperature above the softening or the Vicat melting point of the thermoplastic polymer of which the synthetic fibers are composed.

SUMMARY OF THE INVENTION

By an aspect of the invention a fibrous web containing thermoset resin is provided that has about 3 to about 95% by fiber weight of cellulosic fiber, about 5 to about 97% by fiber weight of synthetic pulp and at least about 2% by weight of thermoset resin based on the weight of the fiber. In the preferred web the thermoset resin is significantly cured and thereafter the web is fracture resistant as determined by cutting the web into strips 15 cm wide by 15 cm long and bending the strips over a 2.5 cm diameter mandrel to the extent of engaging ½ of the mandrel circumference without fracture in repetitions of at least 90 out of 100 repetitions on separate samples, the significant curing of the thermoset resin in the same quantity in an all cellulosic fiber web of the same weight and thickness resulting in fracture in at least 50 out of 100 repetitions when subjected to the same determination.

In the preferred web the cellulosic fiber is present in an amount of at least about 15%, the synthetic pulp is a thermoplastic synthetic pulp and the thermoset resin is present in an amount of at least about 5% and has a curing temperature above the melting, Vicat softening or shrinking by more than 5% temperature of the thermoplastic synthetic pulp.

By another and broad aspect of the invention a composite is provided comprising a thermosettable resin and a thermoplastic member. This composite is formed by a process comprising assembling the thermosettable resin and the member and thereafter thermosetting the resin by subjecting the composite to a temperature higher than the melting point, or Vicat softening point of the thermoplastic member.

In a preferred form the thermoplastic member is the fiber in a synthetic polymeric pulp and has a melting point between 110° and 176° C., a Vicat softening point between 80° and 148° C. or a shrink by more than 5% below 130° C. and thermoset resin is cured at a temperature above about 150° C.

By yet another aspect of the invention a process is provided for forming a thermoset resin impregnated fibrous web comprising forming an aqueous slurry comprising about 3 to about 95 by fiber weight of cellulosic fiber and about 5 to about 97% by fiber weight of polymeric synthetic pulp, dewatering the slurry and forming a web, impregnating the web with a thermosettable resin, and heating the resin until it is cured. In the preferred process the polymeric synthetic pulp fiber is thermoplastic and the heating of the resin is above the melting, softening or shrinking by more than 5% temperature of the thermoplastic synthetic pulp.

By yet another and broad aspect of the invention a method is provided for preparing a thermoset resin—thermoplastic member composite comprising thermosetting the resin while it is combined with said thermoplastic member at a temperature higher than the melting point or Vicat softening point of the member.

BRIEF DESCRIPTION OF THE DRAWINGS

FIG. 1 is a schematic view of the overall apparatus flow process.

FIG. 2 is a fragmentary schematic view of the mandrel testing of the fracture resistance of the web of the present invention.

PREFERRED EMBODIMENT

The present invention in a preferred form is a thermoset resin impregnated fibrous web characterized by having 3 to 95% by fiber weight of cellulosic fiber and 5 to 97% by fiber weight of synthetic pulp and at least 2% by weight of thermoset resin based on the weight of the fiber. As will be further described later other materials and particularly other fibers may be present, for example, 1 to 15% of a long paper making staple fiber having a length of greater than 2 mm.

The cellulosic fiber is preferably purified wood pulp or other naturally occurring cellulosic fiber such as cotton linter, hemp or any other cellulosic fiber suitable for paper making. The preferred fibers would be those prepared by conventional chemical pulping procedures and especially high alpha wood pulp, sulfate process wood pulp and sulfite process wood pulp. The cellulosic fiber is more preferably present in an amount of at least 15% by fiber weight, even more preferably 25%, more preferably 50% and most preferably 60%. The preferred range of the cellulosic fiber content is 25 to 95% by fiber weight more preferably 60 to 95%.

By synthetic pulp it is meant a short predominantly fibrous material having fiber branching generally similar to wood pulp and fiber size and shape at least somewhat similar in size and shape to wood pulp. Such a pulp could be formed of mineral or organic material. The presently preferred synthetic pulp is a synthetic polymeric pulp especially such a material made from plastics, particularly thermoplastic resins such as for example, polymers based on styrene, vinyls such as vinyl chloride, vinylidene, esters, polyamide, acetates, acrylonitrile and preferably the polyolefins. The most preferred thermoplastics are polyolefins having from 2 to 10 carbon atoms, especially those comprised of at least 50 mole percent of ethylene or propylene or mixtures thereof which by definition is to be understood to include copolymers of ethylene and propylene in an amount of at least 70 mole percent. The presently more preferred polyolefins have a melting point below 176° C., more preferably below 135° C., a Vicat softening point below 148° C., more preferably below 113° C. or a shrinking by more than 5%, more preferably by more than 20%, below 130° C. and generally all three of these properties. The most preferred synthetic pulp is a polyethylene having at least a melting point, a Vicat softening point or a shrinking by more than 20% point below 135° C. The presently preferred synthetic pulps have a melting point between 110° and 176° C., a Vicat softening point between 80° and 148° C. or a shrinking by more than 5%, more preferably 20%, point below 130° C. To determine the Vicat temperature a plaque is pressed from the synthetic pulp and the plaque is tested according to ASTM D1525-76.

The preferred synthetic pulps are those derived from a process which involves forming a dispersion (mixture) of a polymer in a solvent, and optionally a water dispersing agent for the polymer, passing this mixture through a nozzle and flash evaporating the solvent to directly yield discrete fibrilated fibers. Such fibers and their production are described in a number of U.S. Patents which were cited in the specification of the previously referred to U.S. Ser. No. 935,280, which specification is incorporated herein by reference. The preferred polyethylene is desirably a low pressure polyethylene having a viscosity average molecular weight range of 20,000 to 2,000,000 as described in U.S. Pat. No. 3,920,508, Col. 8, lines 21-31 and 39-51. U.S. Pat. No. 3,920,508 is also specifically incorporated herein by reference and describes typically preferred synthetic pulps. The synthetic pulp fibers may optionally contain a water dispersing agent. It has been found in the present invention, that the most preferred synthetic pulps are those having the highest degree of branching or fibrilation. Polyolefin fibers of the above type are commercial products. In some instances, particularly in non-battery separator uses, synthetic pulps that are not thermoplastic may be used.

The synthetic pulps are more preferably present within ranges of 5 to 75% by fiber weight and even more preferably 5 to 40%. Preferably the synthetic pulps are present in amounts of at least 10%.

The preferred thermosetting resins are phenolic based, particularly the phenol-aldehydes. Examples of other useful thermosetting resins that are useful in some situations are the furfural-aldehyde resins, urea-aldehyde resins, melamine formaldehyde and polyamide resins. The preferred phenolaldehyde thermosetting resins are cured in preferred curing procedures at temperatures in excess of 100° C., more preferably 135° C. Preferably the phenol-aldehydes are cured at least substantially to the B-stage and more preferably at least partially to the C-stage. The preferred phenol-formaldehyde thermoset resins are cured to the C-stage at temperatures in excess of 135° C., more preferably above 150° C., to reach its state of cure in less than 5 minutes, more preferably less than 1 minute. This is above the melting point, Vicat softening point or shrinking by more than 20% point of the preferred polyethylene based synthetic pulps. The curing temperature is determined by photopyrometry readings on the hottest surface of the article.

The thermoset resin content is more preferably at least 5% by weight based on the weight of the fiber, more preferably 7%, even more preferably 10% and most preferably at least 15%. The preferred upper limit for the thermosetting resin is 200% by weight based on the weight of the fiber, more preferably not more than 100. The preferred range for thermoset resin content is 5 to 100% by weight based on the weight of the fiber, more preferably 10 to 90% and most preferably 20 to 75%.

It is a surprising feature of the present invention that the thermoset resin can have a curing temperature above the melting, Vicat softening or shrinking by more than 5%, or even 20%, temperature of the polymeric synthetic pulp without destroying the desired advantages offered by the synthetic pulp. The synthetic pulp or thermoplastic member in the structure seems to retain at least a substantial amount of its original distribution or even integrity. Although only one of the alternative temperature limits enumerated for the synthetic pulp need be met, it is surprising that when all are met or exceeded during curing, many of the desirable properties, apparently provided by the fibrous nature of the synthetic pulp are retained. The effect of the highly fibrilated synthetic pulp is present in the cured product as though the pulp remains in essentially unchanged condition even though it has not yet been positively proven exactly what the condition of the fiber is in after the curing of the thermosetting resin. Thus even though not yet proven to be present, on the evidence now available, fibrous or fiber in the end product shall mean at the very minimum that the structure is at least twice as long as its diameter. The fibers could, of course, in appropriate instances be joined to one another or to other types of fibers in the form of a network.

By extension the invention is extended to species that include any thermoplastic material, especially those formed of the polymers enumerated as preferred above, and containing or being coated with a thermoset resin, especially the thermoset resins enumerated as preferred above and cured at a temperature above the melting, Vicat or shrink by more than 5% temperature of the thermoplastic material. This extension would include woven webs that for example consist of 100% by fiber weight thermoplastic monofilament yarn and 35% by weight thermoset phenol-formaldehyde resin based on the weight of the fiber or fibers coated with thermoset resins.

As pointed out above the thermoset resin impregnated web of the present invention in some preferred forms also contains long staple fibers. The long fibers may be of various types such as fibrilated ribbon but are preferably paper making staple fibers. By long paper making staple fiber it is meant a monofilament as contrasted to the fibrilated structure of the synthetic pulp. The long fiber length may be between 2 mm and 38 mm and the denier is preferably less than 30 per filament. The fibers tend to be circular in cross-sectional shape although other cross-sectional shapes are suitable. The preferred long fibers are acid resistant and non-electrically conductive. The fiber lengths are more preferably greater than 4 mm, more preferably 6 mm and most preferably greater than 7 mm. The preferred denier of the fiber is 1 to 6.

Preferred fibers are polyester, polypropylene, glass and acrylic. More preferably the long fibers are comprised of polyester, acrylic and glass and most preferably polyester such as that based on or derived from terephthalic acid for example. The long fibers are preferably present in an amount of 0.1 to 50% by fiber weight, more preferably 0.5 to 20% and most preferably 1 to 15% by fiber weight. The long fibers may optionally have on their surface a surfactant to aid in their dispersion in water. In non-lead acid battery separator uses, the fibers need not always be acid resistant and non-electrically conductive. Examples of such other fibers are acetate, nylon and rayon. In fact in some instances these different properties could even be desirable.

Long glass fibers should, when used in a lead acid battery separator, have good chemical resistance to sulfuric acid as evidenced by low weight loss on extended exposure to hot sulfuric acid. The glass which has good chemical resistance will typically lose less than about 2% of its weight after 7 days of exposure to 1.265 sp. gr. sulfuric acid maintained at 180° F. The diameter of the glass fiber may range from about 1 to about 7 microns but preferably will range from about 5 to about 7 microns. The glass may optionally be treated with a surfactant to improve its water dispersability prior to being used in the present invention.

In the present invention it has been found desirable to use a wet strength resin aid. The preferred wet strength resin is a modified polyamide. Other wet strength resin aids that are useful in some situations are urea-formaldehyde, melamine-formaldehyde, acrylamid and polyethyleneimine. The wet strength resin is preferably present in an amount of 0.05 to 5% more preferably 0.1 to 2% based on the weight of the fiber.

The wettability of the battery separator of the present invention may be improved by adding surfactant to the impregnating resin. Suitable surfactants would be bis(alkyl)sulfosuccinate monovalent salts, aryl nonionic surfactants such as alkylaryl polyethylene glycol, alkyl polyethylene glycol, polyethylene propylene glycols, and other surfactants which have been used by those skilled in lead acid battery development. The specific level of surfactant used will depend on the specific surfactant, but is in practice limited to those levels which impart the desired level of wettability but do not have any adverse effect on battery performance or battery life.

Fillers may also be used in the present invention. In lead acid battery separators the fillers should be acid resistant and are preferably water insoluble inorganic materials. Suitable materials are well known. A listing of example materials is contained at Col. 4 of U.S. Pat. No. 3,351,495 which patent is incorporated herein by reference. U.S. Pat. No. 3,351,495 also lists other fillers which are water soluble which would also be satisfactory for use in special webs, particularly for non-battery separator use. Siliceous fillers are preferred when the web is a lead acid battery separator. Materials such as finely chopped glass fibers, those known as microfibers, are counted as fillers not fibers.

The combined weights of the cellulosic fiber, synthetic pulp, long fibers and thermosetting resin constitutes at least 30%, more preferably 50% and most preferably 65% of the web on a dry weight basis. The composition may also contain other conventional formation aids, retention aids, wetting agents and the like.

By an aspect of the invention the preferred finished web of the present invention is surprisingly fracture resistant. By this it is meant that the thermoset web 8 has a plastic characteristic and can be bent, as illustrated in FIG. 2, over a 2.5 cm diameter mandrel 9 without fracture in either the machine direction or cross machine direction. The web to be used for the test should not be ribbed but in other respects should have the same characteristics and be manufactured in the same manner as the finished battery separator. Because the amount of cure can be varied the test for this characteristic improvement over the expected, is to take an all cellulosic web of the same weight (meaning fiber weight per square unit) and thickness and impregnate it with the same quantity of the same resin as the finished web of the present invention and cure the resin as in the finished web of the present invention with which comparison is to be made. Then the all cellulosic web material and the finished web product of the present invention are each cut into 100 strips, 15 cm wide by 15 cm long. Then the strips are sequentially positioned as shown in phantom line in FIG. 2. The ends are drawn to the solid line position shown of FIG. 2 using just enough pressure to maintain the sheet conformed to the circumference of the mandrel as the sheet is bent, until the sheet conforms to the upper ½ of the circumference of the mandrel as illustrated by the dotted line through the mandrel. To meet the test the web product of the present invention retains its integrity without fracture in at least 90 out of 100 repetitions while the all cellulosic web's failure rate is at least 50 out of 100 repetitions. By fracture it is meant that the strip either breaks into at least two disconnected pieces or is still joined but exhibits a flexible fracture area which may be clearly seen as a crack or cracks with exposed fiber ends exhibited therein.

It is believed that the lack of fracture or brittleness and enhancing of flexibility is at least in part brought about by the synthetic pulp interfering with cellulosic fiber to cellulosic fiber bonds by creating instead cellulose—polymeric synthetic pulp—cellulose bonds. It is also believed that flexibilization is enhanced by the chance or randomly occurring of the interposition of the synthetic pulp fiber and fibrils between two cellulosic fibers reducing the effectiveness of the thermosetting resin in "glueing" these junctions together.

It is further believed that the synthetic pulp retains less of the thermosetting resin on its surfaces, increasing the hinging or flexibility characteristic. Further it is believed that the thermosetting resin fails to form bonds or junctures in at least some of the cross overs of fibers where the synthetic pulp is present.

While the preferred non-woven webs of the invention are broadly suitable for filter use the preferred form of the invention is a battery separator. The battery separator preferably has a median pore size of less than 40 microns, more preferably less than 30 microns, and a maximum pore size of less than 50 microns. When the battery separator is installed in a lead acid battery between the positive and negative plates the increase in electrical resistance brought about by the intrusion of the battery separator is preferably less than 5 milliohms·cm².

APPARATUS

FIG. 1 schematically depicts apparatus suitable for forming the web of the present invention. A series of tanks are used to form an aqueous slurry of the ingredients that are to form an unimpregnated web that is suitable for impregnation to form the web of the present invention. The first tank 10 is a pulper equipped with an agitator to which water is charged via water line 12. After the water has been charged to the tank and the agitator started, bailed cellulosic pulp and synthetic pulp are added at 11.

The contents of pulper tank 10 are transferred by pump 13 via transfer line 14 into a dilution chest 15 which is also equipped with an agitator. Addition water line 16 open into the dilution chest 15. The contents of dilution chest 15 are transferred by pump 17 via transfer line 18 to an additive chest 20 which is equipped with an agitator. Water line 21, wet strength resin line 22 and paper making staple fiber feed in point 23 open into addition chest 20. The contents of addition chest 20 are emptied by pump 24 via line 25 into machine chest 26 which is also shown to be equipped with an agitator.

The contents of machine chest 26 are emptied by pump 27 via line 28 into the machine head box 30. Water line 31 also feeds into the head box for further dilution of the slurry.

The contents of the head box 30 are deposited on fourdrinier wire 32 and formed into a wet sheet. Suction boxes 33 facilitate removal of the water. The wet sheet is transferred from the fourdrinier wire to press 35 for additional water removal and sheet compaction. The compacted, substantially dewatered sheet is conveyed via conveyor 36 to a multipass heated air oven 37. From the air oven the sheet passes over a series of steam heated drying cans illustrated as 38–43 to complete the drying. The sheet may then be wound up at station 44 and unwound at station 45 for saturation with a thermo-settable resin.

The sheet is passed through an impregnation or saturation tank 46. Squeeze rolls 47 receive the saturated web from tank 46 and assure a good distribution of the saturant while removing excess saturant. From squeeze rolls 47 the sheet is passed through a heated air oven 48 and rewound at rewind station 49.

The next station is unwind station 50 where the sheet is unwound and passed to a station 51 where ribs are applied if a ribbed battery separator is being formed in the manner of U.S. Pat. No. 3,340,100. The web is then passed to a curing oven 52 where the thermoset resin is cured and the ribs finished. The finished sheet is then passed to a chopper 53 and the sized battery separators are conveyed by belt 54 to packaging station 55.

PROCESS

Turning now to the process of manufacturing the thermoset resin composite materials and impregnated fibrous webs of the present invention the limits and preferred ranges and characteristics of materials previously given with respect to the thermoset resin products of the present invention will not be repeated. They will be understood by those skilled in the art to apply to the process. The process will be described with particular reference to its preferred use in manufacturing battery separators, and particularly using an aqueous based procedure. Its broader adaptability to, for example, non-aqueous web formation techniques and to producing other products will be readily apparent to those of ordinary skill.

In a preferred practicing of the process of the present invention an aqueous slurry is formed containing 3 to 95% by fiber weight of cellulosic fiber and 5 to 97% by fiber weight of synthetic pulp. The percent solids to water in the initial charge is preferably 2 to 10% more preferably 3 to 7%.

Additional materials may be added to the aqueous slurry. This is usually preferably done after the initial slurry is brought to a homogeneous state. If long fibers such as those previously described are to be added they are most opportunely added at this time. This may be followed by the addition of a wet strength resin. Other materials such as fillers and processing aids may also be added at appropriate times which may be determined imperically where necessary.

The final aqueous slurry composition is preferably formed into a homogeneous mass having a solds content of 0.05 to 2% more preferably 0.1 to 1%. This slurry is dewatered to form a fibrous mass or web including any entrained materials. It is generally desirable to compact this web and further dry the web using mechanical and/or heat means to accelerate the drying process. A preferred procedure includes passing the web through a mechanical squeezing means which squeezes out liquid and also serves to compact the web and thereafter passing the web through an oven or over heated cylinders. Preferably the moisture content after drying is 0.5 to 6% more preferably 1 to 3%.

The dried fibrous web is then impregnated with a thermo-setting resin of the character previously described. The resin is preferably applied to the web by submerging the web in an aqueous solution of the resin containing 5 to 60%, more preferably 15 to 40%, resin solids, removing the web from the solution and squeezing the impregnated web to leave the thermosetting resin evenly distributed in the web at the intended solids amount. Then the impregnated web is dried preferably by passage through an oven at a temperature and with a residence time sufficient to reduce the moisture level to that desired, typically less than 20% and more preferably approximately 2 to 6%.

The dried impregnated web is preferably cured at a relatively high temperature in order to effectuate the cure and do so in a relatively short processing time. To effectuate this it is preferable to exceed or go above the melting, softening or shrinking by more than 5% temperature of the synthetic pulp.

In the case of a battery separator, ribs may be applied in ways known to the art either prior to or after curing of the thermosetting resin. After curing the battery separator web may be cut into desired sizes for use in batteries and boxed for shipment to battery manufactures.

In its broader aspects the present invention provides a method of preparing a thermoset resin—thermoplastic member composite comprising thermosetting the resin while it is combined with the thermoplastic member at a temperature higher than the melting point or Vicat softening point of the member.

The thermoplastic member could, of course, be the synthetic thermoplastic fiber that is part of a web and the thermosettable resin can be coated onto the fiber by impregnation of the web before the thermosetting thereof. The thermoplastic fiber is preferably a polyolefin synthetic pulp and the thermosetting resin is preferably a phenol type.

As used in this application impregnation of the web broadly includes adding the impregnant to the initial aqueous slurry before the dewatering thereof formed a definite web. Thus when the web is formed it could, within the purview of the present invention be formed with the impregnant already in it.

EXAMPLE 1

A group of battery separators was formed in the following manner in a continuous process using the apparatus of FIG. 1. The fibrous web was formed with 80% by weight high alpha cellulosic wood pulp, 17% by weight polyethylene synthetic pulp (Pulpex A, a product of Solvay and Cie) and 3% by weight of long polyester fibers that are polyethylene terephthalate staple fibers 1.5 denier×0.6 cm (supplied by Minifibers, Inc.). 80% + 17% + 3% adds up to 100% of the fiber by weight.

A dispersion was formed in the pulper 10 by initially charging water to the pulper and then high alpha cellulosic wood pulp and the synthetic pulp and forming a slurry thereof at a consistency of 4 to 6% by weight solids. As used in this Example this means 4 to 6% fiber by weight and 94 to 96% water by weight. The slurry was maintained in a substantially homogeneous state in the pulper 10 and transferred to the dilution chest 15 where additional water was added to bring the consistency to 3 to 5% fiber by weight.

The diluted slurry was transferred to addition chest 20 where the long polyester fiber was added together with 0.2% (solids) polyamideepichlorohydrin wet strength resin (Kymene 557 from Hercules) by weight based on the weight of the fiber. To determine the weight of the wet strength resin the weight of the fibers would be multiplied by the % of the wet strength resin. Additional water was also added to the slurry in chest 20 to bring the consistency to approximately 3% solids.

The slurry was then transferred to machine chest 26 from which it was transferred to headbox 30 where it was further diluted with water to a consistency of 0.2 to 0.4% solids. The diluted slurry was deposited on fourdrinier wire 32 where the bulk of the water was drained away with the assistance of suction boxes 33. The wet sheet was transferred from the fourdrinier wire to press 35 where the sheet was pressed such that the final dried unimpregnated paper has a thickness of approximately 0.330 and a weight of 114 gram/square meter. The water content is reduced to approximately 60% water and 40% solids by weight.

The compacted, substantially dewatered sheet were passed through multipass heated air oven 37 operated at a temperature of 135° C. and passed over a series of steam heated drums 38-43 operated at a temperature slightly below 120° C. to prevent the sticking of the polyethylene synthetic pulp to the drums. The sheet was thereby dried to a moisture content of 1 to 3%. The sheet was then wound up.

The roll was then unwound and passed through tank 6 containing an aqueous solution of phenol-formaldehyde resin (Plyophen 22-916 supplied by Reichhold Chemical Co.) containing 20% by weight phenolic solids and 4.1% of a surfactant (1.4% Tetronic 1501 supplied by BASF Wyandotte Corp. and 2.7% Sulframin 1298 sulfonic acid supplied by Witco Chemical Corp.) by weight based on the weight of the phenolic solids. Thereafter the sheet was removed from the tank and passed through squeeze rolls 47 to remove the excess solution. The squeeze roll pressure was adjusted so that the sheet contained approximately 30% of phenolic resin solids based on the weight of the fiber. The weight of the phenolic resin solids may thus be determined by multiplying the weight of all of the fibers by the % by weight of phenolic resin. The impregnated sheet was then dried in an air oven 48 at 116° C. and wound up.

Following saturation and drying the phenolic saturated sheet was formed into a ribbed structure at station 51 in the manner substantially as illustrated in U.S. Pat. No. 3,340,100 and thereafter fully cured to heat set the phenolic resin in oven 52 at 270° C. The ribs were, of course, foamed at the same time and the plastisol rib material was cured. The dwell time in the oven was approximately 15 seconds. The finished sheet was then passed to chopper 53 and the sheet was sized to approximately 13 cm long by approximately 13 cm high and packaged at station 55.

The battery separators produced in Example 1 were found to have the superior fracture resistance substantially in accordance with the test for the characteristic described earlier in this application although not performed systematically as described there.

A number of other surprising features have been noted, such as the ability to obtain good even impregnation of the phenol-formaldehyde in a water solution. The synthetic pulp is made from a hydrophobic polymer and is reasonably water resistant and yet as it turns out the solution went into the web readily.

In addition the web can be thinner than conventional cellulosic web without encountering pinholes. Even 114 grams per square meter web exhibits no pinholes. In addition the pores are smaller than a similar web without the synthetic pulp.

While the invention has been described in a preferred form as a battery separator for lead acid batteries, it is clear from inspection of the product that it would perform very usefully in alkaline batteries and also as a filter. In addition the web is observed to have properties that would make it suitable and desirable for use as a printed circuit board and if plied, as a laminate for use in furniture manufacture.

It will be obvious to those skilled in the art that various changes and modifications may be made in the invention without departing from its true spirit and scope. It is, therefore, aimed in the appended claims to cover all such equivalent variations as fall within the true spirit and scope of the invention.

It is claimed:

1. A fibrous web containing thermoset resin, said web comprising about 15 to about 95% by fiber weight of cellulosic fiber; about 5 to about 85% by fiber weight of thermoplastic synthetic pulp fiber; and at least about 5% by weight of thermoset resin based on the weight of the fiber, said thermoset resin having been at least partially cured at a temperature above the melting or Vicat softening or shrinking by more than 5% temperature of said thermoplastic synthetic pulp and thereafter said web being fracture resistant as determined by cutting said web into strips 15 cm wide by 15 cm long and bending said strips over a 2.5 cm diameter mandrel to the extent of engaging ½ of the mandrel circumference without fracture in repetitions of at least 90 out of 100 repetitions using a separate strip for each repetition, said at least partial curing of said thermoset resin in the same quantity in an all cellulosic fiber web of the same weight and thickness resulting in fracture in at least 50 out of 100 repetitions when subjected to said determination.

2. The web of claim 1 wherein the cellulosic fiber is present in an amount of at least about 25%, said thermoplastic synthetic pulp fiber comprising polyolefin and said thermoset resin is present in an amount of at least about 7% and is a phenol-aldehyde type cured at least partially to the C-stage.

3. The web of claim 2 wherein the cellulosic fiber is present in an amount of at least about 50%, said polyolefin is polyethylene and said phenol-aldehyde thermoset resin is present in an amount between about 10 and about 90% by weight based on the weight of the fiber.

4. The web of claim 1 wherein the cellulosic fiber contains at least 50% by fiber weight of fiber selected from the group consisting of cotton linters, high alpha wood pulp, sulfate process wood pulp or sulfite process wood pulp and said thermoplastic synthetic pulp fiber has a melting point between about 110 and about 176° C. or a Vicat softening point between about 80 and about 148° C. or a shrinking by more than 5% point below 130° C. and said phenol-aldehyde thermoset resin being cured at least partially to the C-stage at a temperature in excess of about 150° C. and said web comprising about 1 to about 50% of long fiber having a length of greater than 4 mm.

5. The web of claim 4 wherein said thermoplastic synthetic pulp fiber is comprised of a hydrophobic polymer and said long fiber is paper making staple fiber present in an amount of about 1 to about 15% and having a length of greater than 6 mm and a denier of about 1 to about 6.

6. A fibrous web containing thermoset resin, said web comprising about 25% to about 95% by fiber weight cellulosic fiber, about 5 to about 75% by fiber weight synthetic pulp fiber and about 5 to about 100% by weight thermoset resin based on the weight of the fiber.

7. The web of claim 6 wherein said cellulosic fiber is present in an amount of about 60 to about 95% by fiber weight and said synthetic pulp fiber is present in an amount of about 5 to about 40% by fiber weight and said thermoset resin is present in an amount of about 20 to about 75% by weight based on the weight of the fiber.

8. The web of claim 7 comprising about 0.5 to about 20% by fiber weight long staple fiber.

9. The web of claim 7 wherein said cellulosic fiber contains at least 50% by fiber weight of fiber selected from the group consisting of cotton linters, high alpha wood pulp, sulfate process wood pulp or sulfite process wood pulp and said synthetic pulp fiber is polyolefin comprised of at least about 70 mole percent of ethylene or propylene or mixtures thereof.

10. The web of claim 9 comprising about 1 to about 15% by fiber weight of a paper making staple fiber having a length of greater than 4 mm and a denier of about 1 to about 6 and wherein said polyolefin synthetic pulp fiber has a melting point between about 110° and about 176° C. or a Vicat softening point between about 80° and about 148° C. or a shinking by more than 5% point below 130° C. and said thermoset resin is a phenol—aldehyde cured at least partially to the C-stage at a temperature in excess of about 150° C.

11. A composite comprising a thermosettable resin and a thermoplastic member, said composite being formed by a process comprising assembling said thermosettable resin and said member and thereafter thermosetting said resin by subjecting said composite to a temperature higher than the melting point, or Vicat softening point of said thermoplastic member.

12. The material of claim 11 wherein said thermoplastic member is a fiber.

13. The material of claim 12 wherein said fiber is a synthetic polymeric pulp and part of a fibrous web and said thermoset resin is present as an impregnant in an amount of at least 2% by weight based on the weight of the fiber in said web.

14. The material of claim 13 wherein said fibrous web contains at least 5% by fiber weight of synthetic polymeric pulp and at least 5% by weight cured thermoset resin based on the weight of the fiber.

15. The material of claim 14 wherein said synthetic polymeric pulp has a melting point between 110° and 176° C. or a Vicat softening point between 80° and 148° C. or a shrink by more than 5% point below 130° C.

16. The material of claim 15 wherein said thermoset resin is present in an amount of more than 10% by weight based on the weight of the fiber and was cured at a temperature above about 150° C.

17. A battery separator comprising a fibrous web containing thermoset resin, said web comprising about 15% to about 95% by fiber weight cellulosic fiber, about 5 to about 85% by fiber weight thermoplastic synthetic pulp fiber and at least about 5% by weight thermoset resin based on the weight of the fiber.

18. The battery separator of claim 17 wherein said thermoset resin has been at least partially cured at a temperature above the melting or Vicat softening or shrinking by more than 5% temperature of said thermoplastic synthetic pulp fiber and said battery separator is fracture resistant as determined by cutting said battery separator into strips 15 cm wide by 15 cm long and bending said strips over a 2.5 cm diameter mandrel to the extent of engaging ½ of the mandrel circumference without fracture in repetitions of at least 90 out of 100 repetitions using a separate strip for each repetition, said at least partial curing of said thermoset resin in the same quantity in an all cellulosic fiber web of the same weight and thickness resulting in fracture in at least 50 out of 100 repetitions when subjected to said determination.

19. The battery separator of claim 17 wherein the cellulosic fiber is present in said fibrous web in an amount of at least about 25%, said thermoplastic synthetic pulp fiber comprising polyolefin and said thermoset resin is present in an amount of at least about 7% and is a phenol-aldehyde type cured at least partially to the C-stage.

20. The battery separator of claim 17 wherein the cellulosic fiber contains at least 50% by fiber weight of fiber selected from the group consisting of cotton linters, high alpha wood pulp, sulfate process wood pulp or sulfite process wood pulp and said thermoplastic synthetic pulp fiber has a melting point between about 110° and about 176° C. or a Vicat softening point between about 80° and about 148° C. or a shrinking by more than 5% point below 130° C. and said phenol-aldehyde type thermoset resin being cured at least partially to the C-Stage at a temperature in excess of about 150° C. and said web comprising about 1 to about 50% of long fibers having a length of greater than 4 mm.

21. A process of forming a thermoset resin impregnated fibrous web comprising forming an aqueous slurry comprising about 3 to about 95% by fiber weight of cellulosic fiber and about 5 to about 97% by fiber weight of thermoplastic polymeric synthetic pulp fiber, dewatering said slurry and forming a web, impregnating said web with a thermosettable resin in an amount of at least about 2% by weight based on the weight of the fiber, and thereafter heating said thermosettable resin above the melting or Vicat softening or shinking by more than 5% temperature of said thermoplastic synthetic pulp fiber until said resin is at least partially cured.

22. A process of forming a thermoset resin impregnated fibrous web comprising
   (1) forming an aqueous slurry comprising about 25 to about 95% by fiber weight cellulosic fiber and about 5 to about 75% by fiber weight synthetic pulp fiber consisting essentially of polyolefin and having at least a melting point or a softening point or a shrinking by more than 5% point below 150° C.;
   (2) after the formation of said aqueous slurry adding a wet strength resin to said aqueous slurry in an amount of about 0.1 to about 2% by weight based on the weight of the fiber and adding long fiber to said aqueous slurry in an amount of about 1 to about 15% by fiber weight;
   (3) dewatering said slurry and forming a web;
   (4) impregnating said web with thermosettable resin in an amount of at least 5% by weight based on the weight of the fiber; and
   (5) thereafter heating said thermosettable resin impregnate to a temperature in excess of about 80° C., and at least partially curing said resin.

23. The process of claim 22 wherein said cellulosic pulp is present in an amount of at least about 50% by fiber weight and contains at least 50% by fiber weight of fiber selected from the group consisting of cotton linters, high alpha wood pulp, sulfate process wood pulp or sulfite process wood pulp; said polyolefin synthetic pulp fiber is present in an amount of at least 10% and is comprised of at least about 70 mole percent of ethylene or propylene or mixtures thereof and has at least a melting point below about 176° C. or a Vicat softening point below 148° C. or a shrinking by more than 20% point below 130° C.; said heating is to a temperature in excess of about 150° C.; said thermosettable resin is a phenol-aldehyde resin and is applied to said fibrous web from solution and left in said web in an amount of about 10 to about 50% by weight based on the weight of the fiber; said curing is at least partially to the C-stage; and said process comprising adding about 1 to about 15% of a paper making staple fiber having a length greater than 6 mm and a denier of less than 30 per filament.

24. The method of preparing a thermoset resin—thermoplastic member composite comprising thermosetting said resin while it is combined with said thermoplastic member at a temperature higher than the melting point or Vicat softening point of said member.

25. The method of claim 24 wherein said thermoplastic member is a fiber formed into a web and said method includes forming said composite by impregnating said web with the thermosettable resin.

26. The method of claim 25 wherein said fiber is a synthetic pulp comprised of a hydrophobic polymer and said thermosetting resin is applied from an aqueous solution.

27. The method of claim 26 wherein said fiber is a polyolefin synthetic pulp and said thermosettable resin is a phenol type present in an amount of at least 5% by weight based on the weight of the fiber in said web.

* * * * *